United States Patent
Liao et al.

(10) Patent No.: US 11,306,905 B1
(45) Date of Patent: Apr. 19, 2022

(54) ASSEMBLY STRUCTURE

(71) Applicant: TAIWAN OASIS TECHNOLOGY CO., LTD., New Taipei (TW)

(72) Inventors: Shih-Meng Liao, New Taipei (TW); Che-Wei Yeh, New Taipei (TW)

(73) Assignee: TAIWAN OASIS TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/241,183

(22) Filed: Apr. 27, 2021

(51) Int. Cl.
  *F21V 21/30* (2006.01)
  *F21S 2/00* (2016.01)
  *F16B 7/18* (2006.01)

(52) U.S. Cl.
  CPC .............. *F21V 21/30* (2013.01); *F16B 7/182* (2013.01); *F21S 2/005* (2013.01)

(58) Field of Classification Search
  CPC .......... F21V 21/30; F21V 21/22; F16B 7/182; F21S 2/005
  See application file for complete search history.

(56) References Cited

U.S. PATENT DOCUMENTS

| 8,801,236 | B2 * | 8/2014 | Hsieh | ................. | F21V 15/01 |
| | | | | | 362/362 |
| 2010/0118538 | A1 * | 5/2010 | Kay | ................. | F21V 21/30 |
| | | | | | 362/271 |
| 2013/0192891 | A1 * | 8/2013 | Davis | ................. | F21V 21/12 |
| | | | | | 174/75 R |
| 2020/0240578 | A1 | 7/2020 | Chen | | |
| 2020/0332986 | A1 * | 10/2020 | Xia | ................. | F21V 21/10 |
| 2021/0190242 | A1 * | 6/2021 | Westgarth | ............. | F16L 19/025 |

FOREIGN PATENT DOCUMENTS

| CN | 209116075 U | | 7/2019 |
| CN | 111396800 A | * | 7/2020 |
| GN | 107690554 A | | 2/2018 |
| GN | 211083835 U | | 7/2020 |
| TW | 201329385 A | | 7/2013 |
| TW | M619887 U | | 11/2021 |

OTHER PUBLICATIONS

1St office action for corresponding TW Application No. 110118432 dated Dec. 22, 2021.

* cited by examiner

*Primary Examiner* — William N Harris
(74) *Attorney, Agent, or Firm* — Demian K. Jackson; Jackson IPG PLLC

(57) ABSTRACT

In order to solve the problem of loosening that may occur in the assembly structure of the prior art when the user wants to rotate the inner joint assembly to change the light angle of the lighting device installed in the inner joint assembly during the rotation process, an embodiment of the present disclosure provides an assembly structure with a slot. In the present disclosure, only when a card part is inserted into the slot, can the inner joint assembly and outer joint assembly be allowed to be locked with or unlocked from each other by rotation, otherwise only the inner joint assembly can be rotated relative to the outer joint assembly, but both of them cannot be locked with or unlocked from each other by rotation.

10 Claims, 8 Drawing Sheets

ASSEMBLY STRUCTURE

BACKGROUND

1. Technical Field

The present disclosure relates to an assembly structure, and particularly relates to an assembly structure provided with a slot, wherein the assembly structure can be disassembled or assembled only when a card part is inserted into the slot.

2. Related Art

The assembly structure of the current table lamp or standing lamp will be designed to allow the inner joint assembly and the outer joint assembly to rotate relative to each other, so that the lighting device installed in the assembly structure can change its lighting angle, adjust the brightness and perform on/off control. However, the assembly structure of the China Patent Application No. CN201922245446.1 only provides a lamp with two-step rotation, but cannot rotate steplessly and cyclically, and during the rotation process, it may sometimes cause the outer joint assembly and the inner joint assembly to be loose from each other.

SUMMARY

The purpose of the present disclosure is to provide an assembly structure which inner joint assembly and outer joint assembly can rotate steplessly and cyclically, and the assembly structure can be disassembled or assembled via a card part to avoid that the outer joint assembly and the inner joint assembly may be loose from each other when rotating.

According to an objective of the present disclosure, an assembly structure comprising an outer joint assembly and an inner joint assembly is provided. The an outer joint assembly comprises a first case, wherein interior of the first case forms a first accommodating space, the first case has a first outer surface and a first inner surface opposite to the first outer surface, and the first inner surface is provided with a first locking structure in the first accommodating space. The inner joint assembly comprises a second case and a core part assembly, wherein the core part assembly is composed of a core part and a third case, the second case is used to extend into the first accommodating space, interior of the second case forms a second accommodating space, the second case has a second outer surface a second inner surface opposite to the second outer surface, the second outer surface is provided with a second locking structure corresponding to the first locking structure, the core part is used to extend into the second accommodating space, a side of the core part is connected to a side of the third case, an outer surface of the core part contacts the second inner surface, and the second case and the third case are provided with a slot therebetween According to the above features, when a card part is inserted into the slot, two sides of the card part are respectively engaged by the second case and the third case, and the second locking structure is capable of being locked with or unlocked from the first locking structure by rotation, so that the outer joint assembly and the inner joint assembly is disassembled or assembled; when the card part is not inserted into the slot, the second locking structure cannot be locked with or unlocked from the first locking structure by rotation, but the core part assembly is capable of being rotated relative to the second case with a rotation axis.

According to the above features, when the card part is not inserted in the slot, a first maximum static friction force to be overcome for rotating the core part assembly relative to the second case with the rotation axis is smaller than a second maximum static friction force to be overcome for locking or unlocking the second locking structure and the first locking structure by rotation, so that when the core part assembly is rotated relative to the second case with the rotation axis, the second locking structure and the first locking structure cannot be locked or unlocked by rotation.

According to the above features, when the card part is inserted into the slot, the side of the card part contacts the second case, and a third maximum static friction force that needs to be overcome when the core part assembly is rotated relative to the second case with the rotation axis is generated, wherein the third maximum static friction force is larger than the second maximum static friction force, so that when the second locking structure and the first locking structure are locked or unlocked by rotation, the core part assembly cannot be rotated relative to the second case with the rotation axis.

According to the above features, the first locking structure comprises a plurality of first threads, and the second locking structure comprises a plurality of second threads relative corresponding to the first threads, so that the first locking structure is able to be rotatably engaged with the second locking structure.

According to the above features, an electric socket or an electric plug is provided on a side of the core part away from the third case.

According to the above features, the first case further has an inner wall, the inner wall is arranged in the first accommodating space, the inner wall is connected to the first inner surface, and the inner wall is provided with an electric socket or an electric plug.

According to the above features, the core part and the third case are integrally formed to form the core part assembly.

According to the above features, the core part and the third case are connected to each other by at least one fixing means to form the core part assembly.

According to the above features, the inner joint assembly further comprises a locating gasket, which is connected to a side of the second case away from the slot and partially protrudes from the second inner surface, and the core part is provided with a locating hole away from the outer surface of the third case, so that when the core part extends into the second accommodating space, the part of the locating gasket protruding from the second inner surface will be accommodated in the locating hole to locate the core part.

In summary, the embodiment of the present disclosure provide an assembly structure with a slot, in which only when the card part is inserted into the slot, can the inner joint assembly and the outer joint assembly be rotated for locking or unlocking, otherwise only the inner joint assembly rotates relative to the outer joint assembly, but cannot be locked with or unlocked from each other by rotation. Accordingly, it can solve the technical problem that the inner joint assembly and the outer joint assembly of the prior art may be easily loosen when the user rotates the electric device installed in the inner joint assembly by rotating the inner joint assembly.

BRIEF DESCRIPTIONS OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTIONS OF EXEMPLARY EMBODIMENTS

To understand the technical features, content and advantages of the present disclosure and its efficacy, the present disclosure will be described in detail with reference to the accompanying drawings. The drawings are for illustrative and auxiliary purposes only and may not necessarily be the true scale and precise configuration of the present disclosure. Therefore, the scope of the present disclosure should not be limited to the scale and configuration of the attached drawings.

In order to solve the problem of loosening that may occur in the assembly structure of the prior art when the user wants to rotate the inner joint assembly to change the light angle of the lighting device installed in the inner joint assembly during the rotation process, an embodiment of the present disclosure provides an assembly structure with a slot. In the present disclosure, only when a card part is inserted into the slot, can the inner joint assembly and outer joint assembly be allowed to be locked with or unlocked from each other by rotation, otherwise only the inner joint assembly can be rotated relative to the outer joint assembly, but both of them cannot be locked with or unlocked from each other by rotation.

Figure 1:
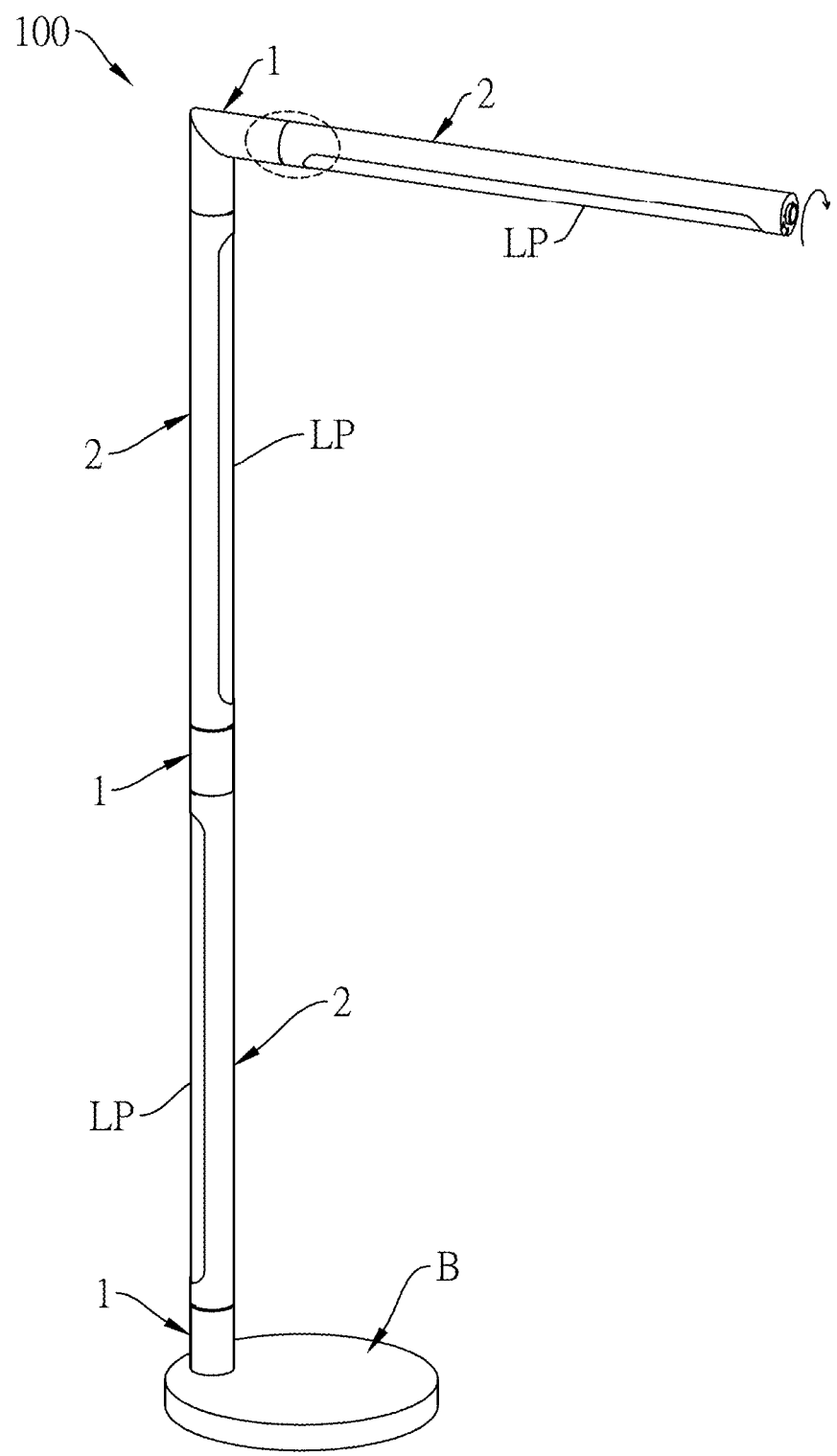
FIG. 1 is a three dimensional diagram of an electric apparatus using an assembly structure of a first embodiment of the present disclosure.

Refer to FIG. 1, and FIG. 1 is a three dimensional diagram of an electric apparatus using an assembly structure of a first embodiment of the present disclosure. In this embodiment, the electric apparatus is a desk lamp or a standing lamp, and however, the present disclosure does not limit the assembly structure 100 to the application and type of the electrical apparatus. The electric apparatus in this embodiment comprises a plurality of outer joint assemblies 1, a plurality of inner joint assemblies 2 and a base B. Each of the outer joint assembles 1 can be connected with at least one inner joint assembly 2, and each of the inner joint assemblies 2 can be connected with at least one outer joint assembly 1. In addition, one of the outer joint assemblies 1 can be connected with the base B. The electric device LP, such as a lighting device, a heating device, a display device or other electric devices, can be installed in the inner joint assembly 2. In this embodiment, the shape of one of the outer joint assemblies 1 is L-shaped, but the present disclosure is not limited thereto.

Figure 2:
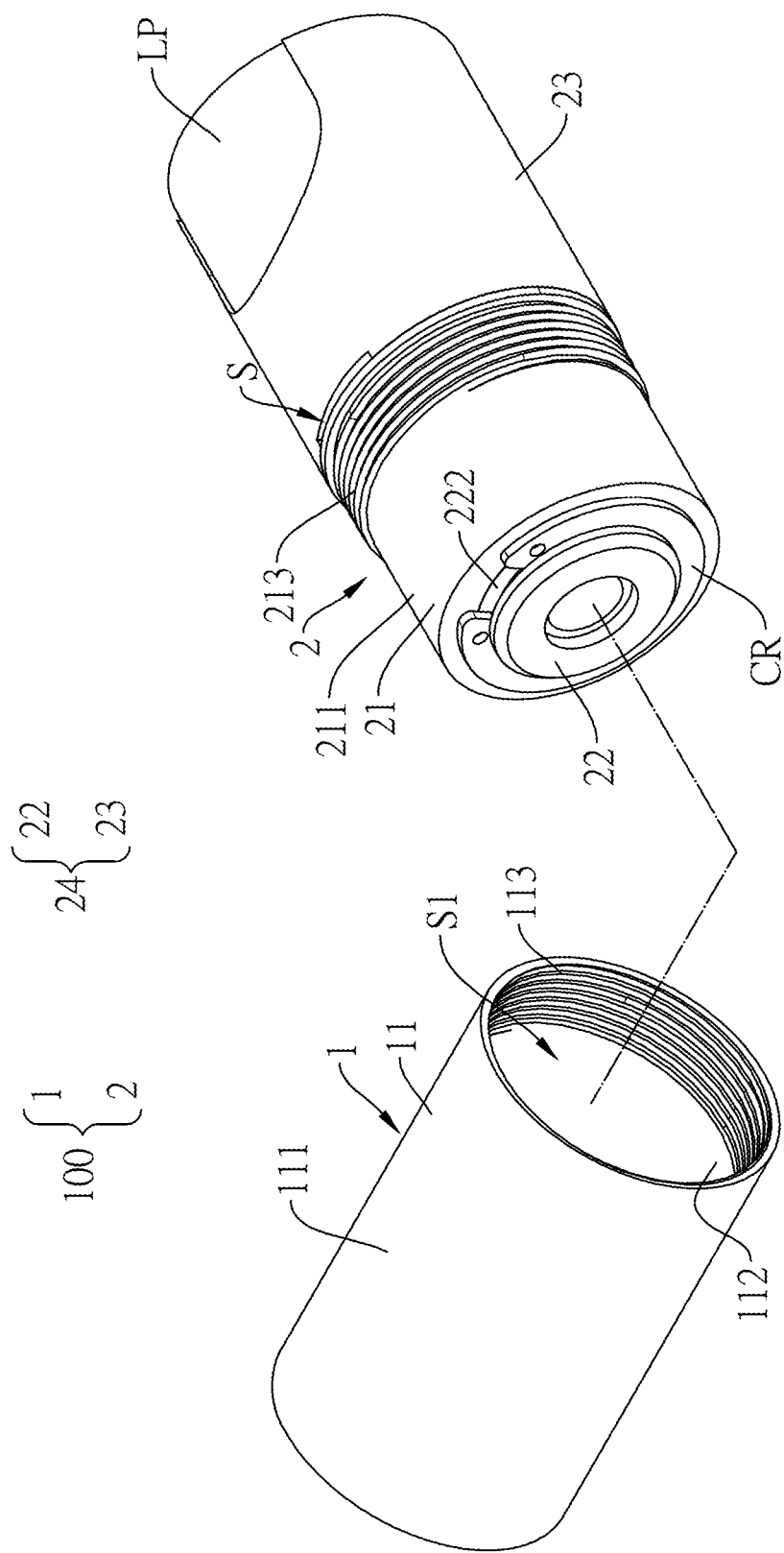
FIG. 2 is an explosive diagram of the assembly structure of the first embodiment of the present disclosure.
Figure 4:
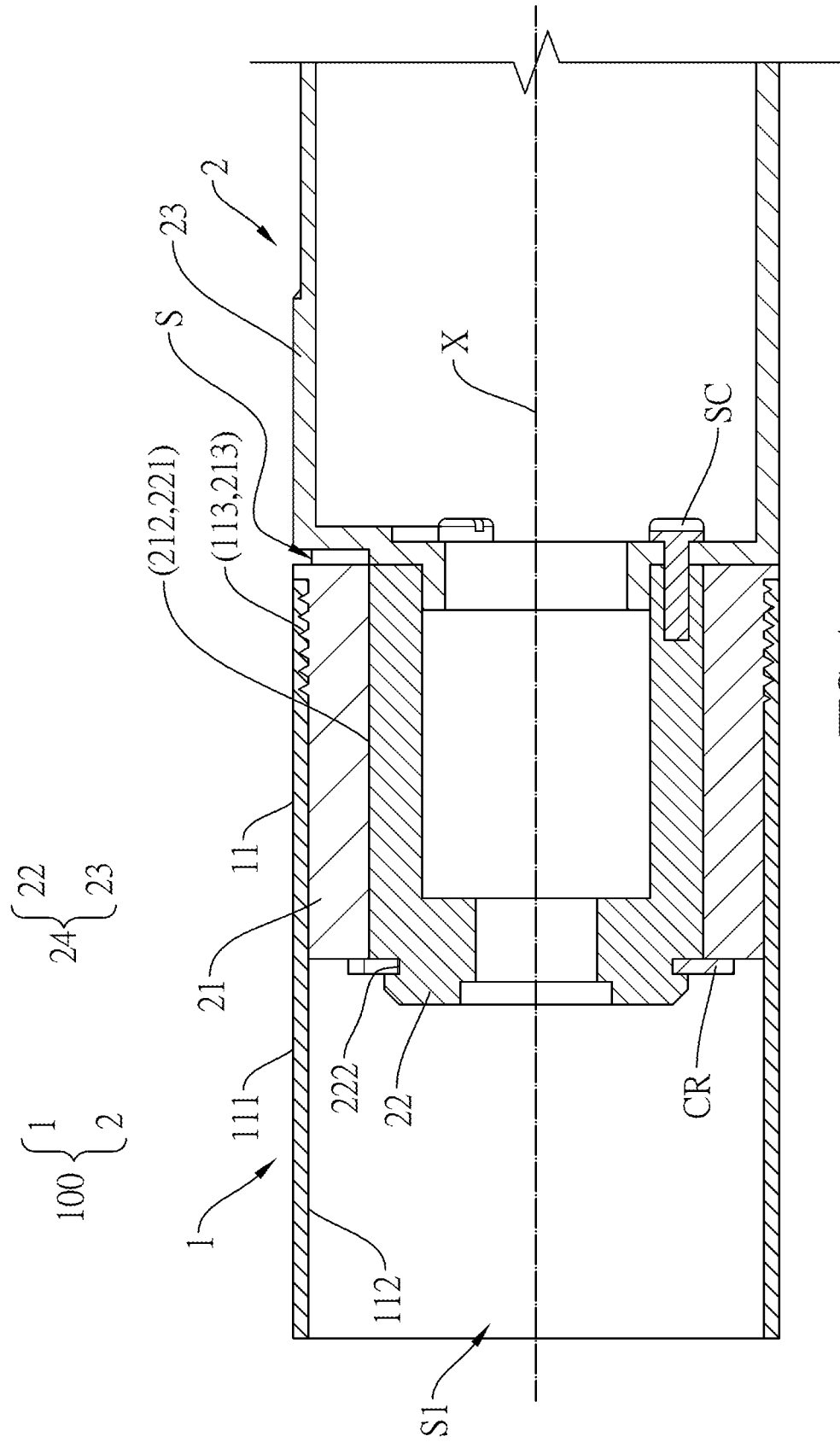
FIG. 4 is a sectional diagram of the assembly structure provided by the first embodiment of the present disclosure.
Figure 5:
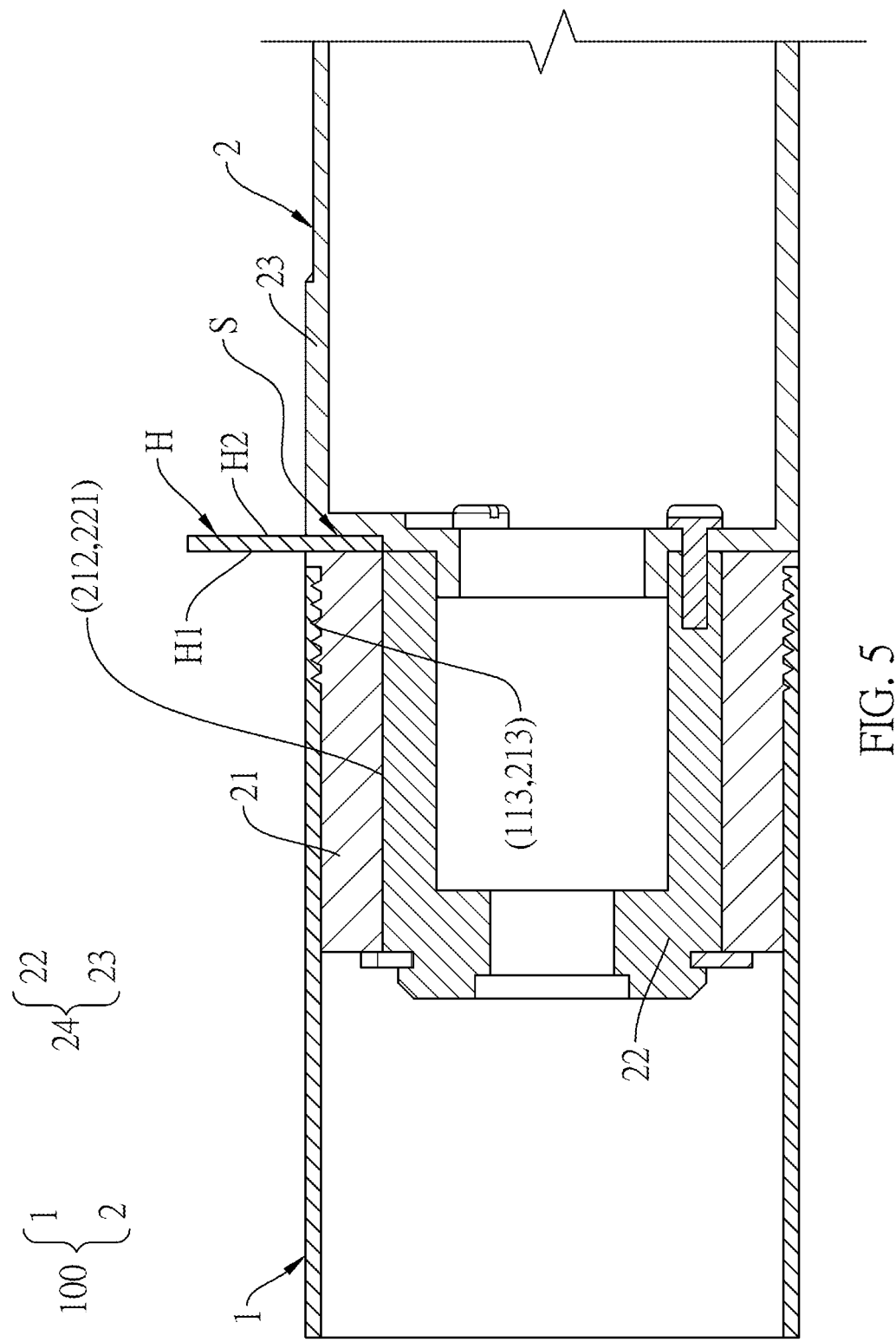
FIG. 5 is a sectional diagram of the assembly structure provided by the first embodiment of the present disclosure when disassembling the assembly structure.
Figure 6:
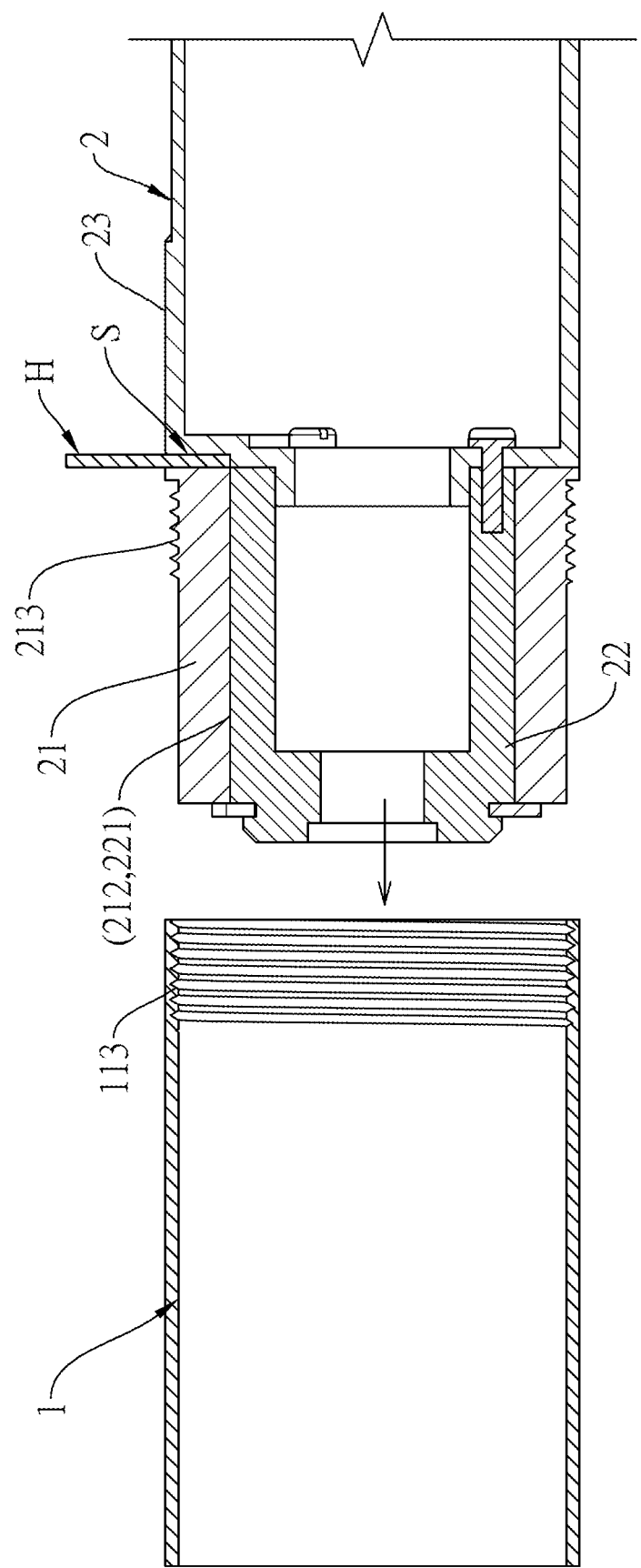
FIG. 6 is a sectional diagram of the assembly structure provided by the first embodiment of the present disclosure when assembling the assembly structure.

The assembly structure 100 has a slot S (as shown in FIG. 2). When a card part H (as shown in FIG. 5 and FIG. 6) is not inserted into the slot S, the second case 21 (as shown in FIG. 4) of inner joint assembly 2 and outer joint assembly 1 cannot be rotated to lock or rotated to unlock, but the core part assembly 24 (as shown in FIG. 4) of the inner joint assembly 2 can be rotated relative to the outer joint assembly 1, so as to make the electric device LP installed in the inner joint assembly 2 rotated synchronously. In this way, the technical problem that the inner joint assembly 2 and the outer joint assembly 1 are easily loosened when the electric device LP is rotated can be solved. In addition, the slot S can be deliberately designed to have the same thickness as ordinary credit cards, coins or pass cards, so that when users want to disassemble and assemble the assembly structure 100, they can use their carry-on items as the card part H.

Figure 3:
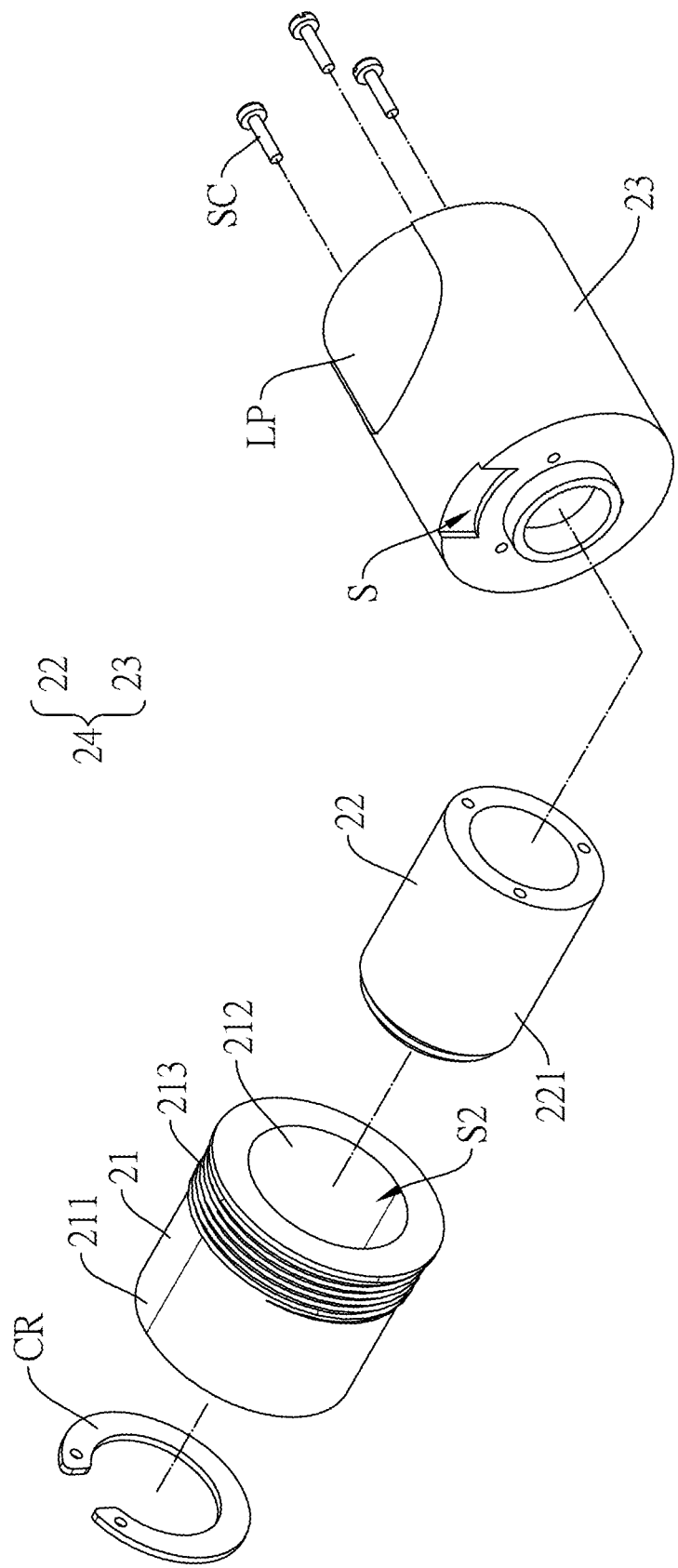
FIG. 3 is an explosive structural diagram of the inner joint assembly of the assembly structure provided by the first embodiment of the present disclosure.

Refer to FIG. 2, FIG. 3 and FIG. 4, FIG. 2 is an explosive diagram of the assembly structure of the first embodiment of the present disclosure, FIG. 3 is an explosive structural diagram of the inner joint assembly of the assembly structure provided by the first embodiment of the present disclosure, and FIG. 4 is a sectional diagram of the assembly structure provided by the first embodiment of the present disclosure. The outer joint assembly 1 comprises a first case 11, wherein the part of the assembly structure 100 shown by FIG. 2, FIG. 3 and FIG. 4 corresponds the to the dashed part of FIG. 1. Interior of the first case 11 forms a first accommodating space S1. The first case 11 has a first outer surface 111 and a first inner surface 112, the first outer surface 111 and the first inner surface 112 are opposite to each other, and the first inner surface 112 is provided with a first locking structure 113 in the first accommodating space S1. The first inner surface 112 is an annular inner surface, but the first outer surface 111 may be a non-annular outer surface.

The inner joint assembly 2 comprises a second case 21 and a core part assembly 24, wherein the core part assembly 24 is composed of the core part 22 and the third case 23, and one side of the core part 22 is connected to one side of the third case 23. The core part 22 and the third case 23 can be integrally formed to form a core part assembly 24, or the core part 22 and the third case 23 are connected to each other by at least one fixing means to form the core part assembly 24, wherein fixing means can be a screw SC, but the present disclosure is not limited thereto. Other types of the fixing means, such as bonding, welding, riveting, clamping or nailing can be used.

The second case 21 is used to extend into the first accommodating space S1. Interior of the second case 21 forms a second accommodating space S2, the second case 21 has a second outer surface 211 and a second inner surface 212, and the second outer surface 211 and the second inner surface 212 are opposite to each other. The second inner surface 212 is an annular inner surface, and the second outer surface 211 is an annular outer surface. The second outer surface 211 is provided with a second locking structure 213 corresponding to the first locking structure 113. The first locking structure 113 comprises a plurality of first threads, and the second locking structure 213 comprises a plurality of second threads corresponding to the first threads, so that the first locking structure 113 and the second locking structure 213 can be rotatably engaged. The core part 22 is used to extend into the second accommodating space S2, the outer surface 221 of the core part 22 is in contact with the second inner surface 212, and a slot S is formed between the second case 21 and the third case 23.

In addition, the inner joint assembly 2 can optionally further comprise a locating gasket CR. The locating gasket CR is connected to the side of the second case 21 away from the slot S, and partially protrudes from the second inner surface 212, and the outer surface 221 of the core part 22 away from the third case 23 is provided with a locating hole 222. When the core part 22 is extended into the second accommodating space S2, the part of the locating gasket CR protruding from the second inner surface 212 will be accommodated in the locating hole 222 for locating the core part 22.

When the card part H is not inserted into the slot S, the second locking structure 213 cannot be locked with or unlocked from the first locking structure 113 by rotation, but the core part assembly 24 can be rotated relative to the second case 21 with the rotation axis X. In other words, at this time, the inner joint assembly 2 can rotate relative to the outer joint assembly 1, but the inner joint assembly 2 and the outer joint assembly 1 will not loosen.

Specifically, if the card part H is not inserted into the slot S, when the core part assembly 24 is rotated with rotation axis X relative to second case 21, a force applied is necessary to overcome a first maximum static friction force generated by that the outer surface 221 of the core part 22 contacts the second inner surface 212 of the second case 21. The second locking structure 213 and the first locking structure 113 are in contact with each other, so there is a second maximum static friction force. In the design, the first maximum static friction force is smaller than the second maximum static friction force through the selection of material, surface roughness or other factors that affect the maximum static friction force. Therefore, when the user exerts a rotation force greater than the first maximum static friction force, the core part assembly 24 will be rotated in a stepless and cyclical manner with the rotation axis X relative to the second case 21. At this time, the outer surface 221 of the core part 22 contacts the second inner surface 212 of the second case 21, and there is also a dynamic friction force. Therefore, as long as the rotation force does not immediately exceed the second maximum static friction force, the second locking structure 213 cannot be locked with or unlocked from the first locking structure 113 by rotation.

Next, refer to FIG. 5 and FIG. 6, FIG. 5 is a sectional diagram of the assembly structure provided by the first embodiment of the present disclosure when disassembling the assembly structure, and FIG. 6 is a sectional diagram of the assembly structure provided by the first embodiment of the present disclosure when assembling the assembly structure. When the assembly structure 100 is to be disassembled or assembled, as long as the card part H is inserted into the slot S, the two sides H1 and H2 of the card part H will be engaged by the second case 21 and the third case 23 respectively, so that the second locking structure 213 can be locked with or unlocked from the first locking structure 113 by rotation, but the core part assembly 24 cannot be rotated relative to the second case 21 with the rotation axis X, so that the outer joint assembly 1 and the inner joint assembly 2 can be disassembled or assembled.

Specifically, if the card part H is inserted into the slot S, one side H1 of the card part H contacts the second case 21, so there is a third maximum static friction force generated by the side H1 of the card part H and the second case 21. At this time, if the user want to rotate the core part assembly 24 relative to the second case 21 with the rotation axis X, it is necessary to apply a rotating force that is instantaneously greater than the third maximum static friction force. In terms of design, the third maximum static friction force is greater than the second maximum static friction force through the choice of material, surface roughness or other factors that affect the maximum static friction force. Therefore, when the user applies the rotating force greater than the second maximum static friction force, the second locking structure 213 and the first locking structure 113 will be locked or unlocked by rotation. At this time, there is a dynamic friction between the second locking structure 213 and the first locking structure 113 still exist, and therefore, as long as the rotating force does not immediately exceed the third maximum static friction force, the core part assembly 24 cannot be rotated relative to the second case 21 with the rotation axis X.

Figure 7:
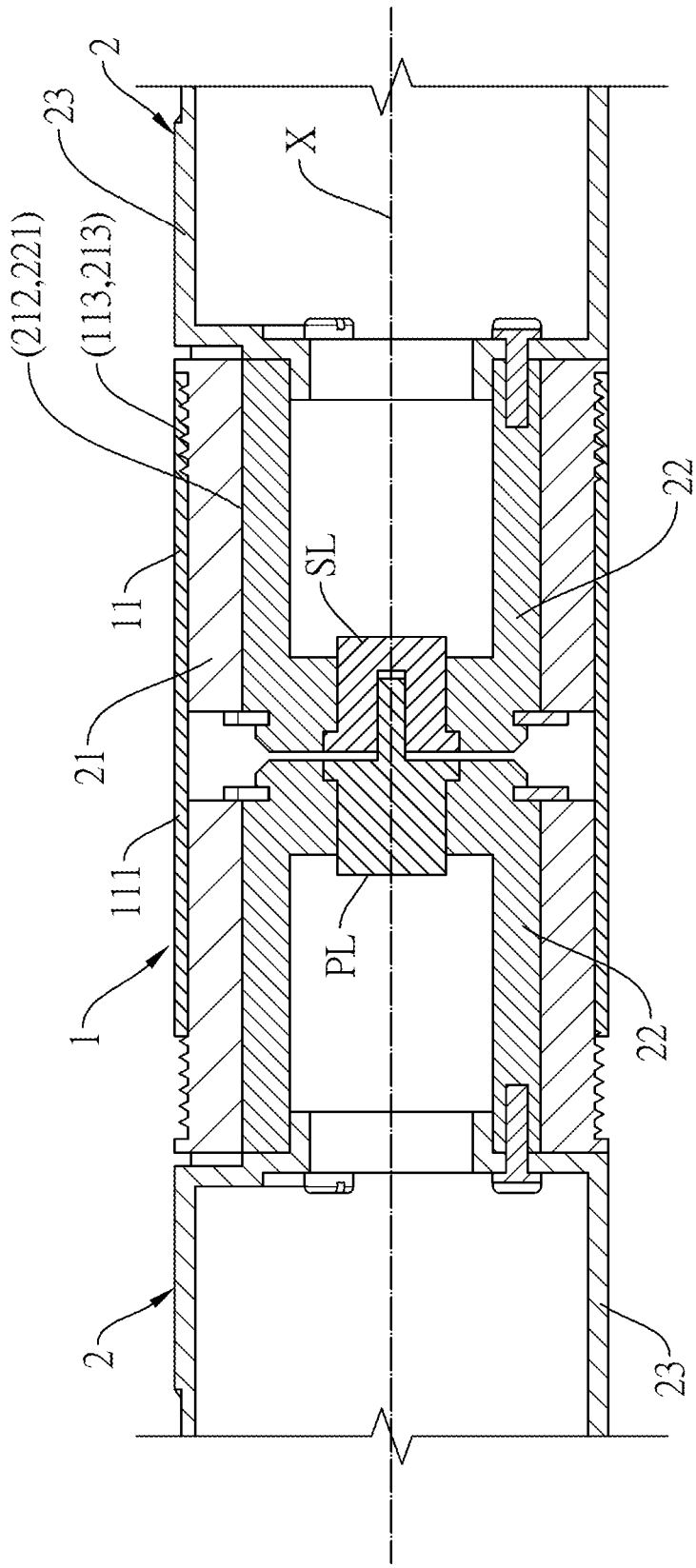
FIG. 7 is a sectional diagram of the assembly structure provided by a second embodiment of the present disclosure.
Figure 8:
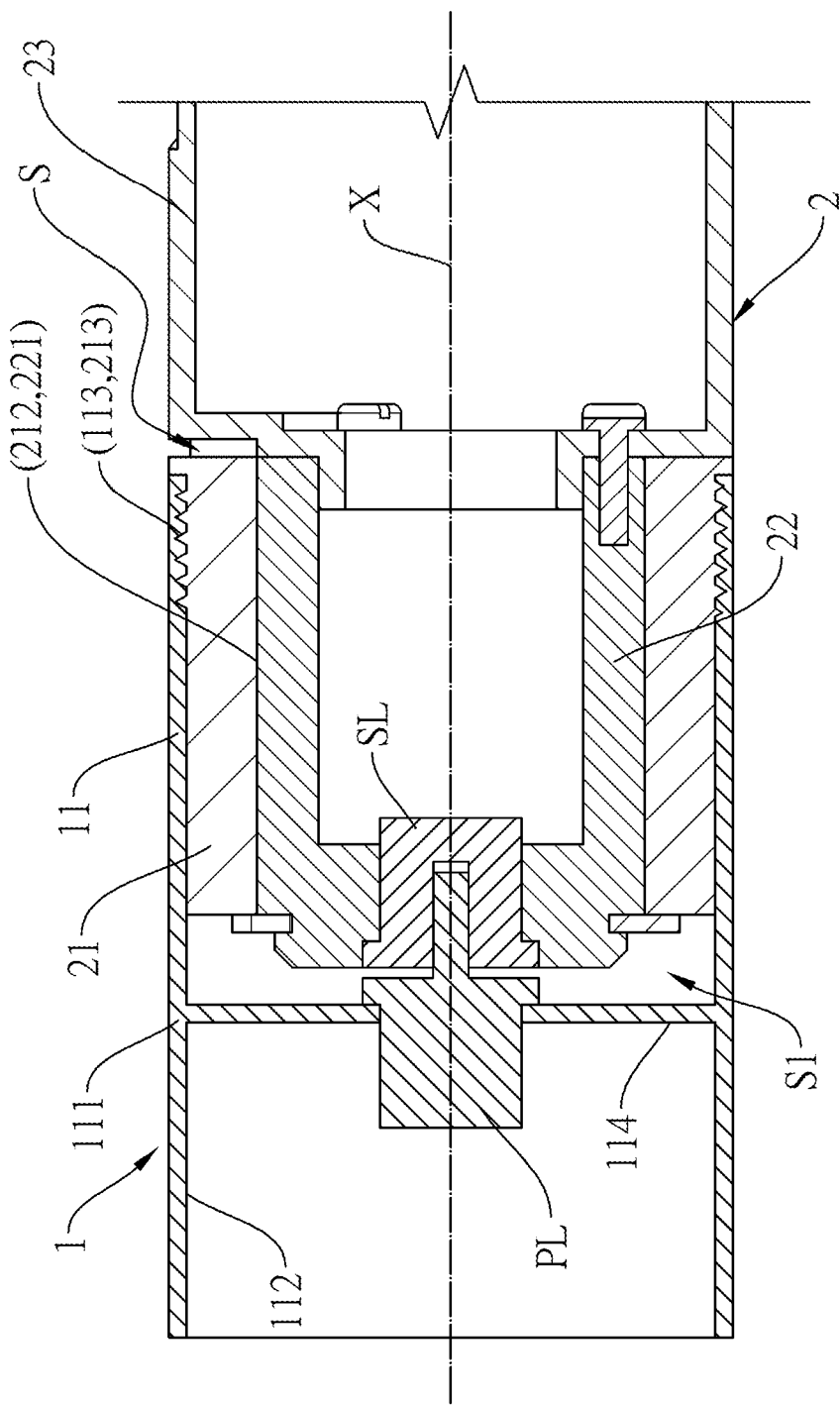
FIG. 8 is a sectional diagram of the assembly structure provided by a third embodiment of the present disclosure.

Next, refer to FIG. 7 and FIG. 8, FIG. 7 is a sectional diagram of the assembly structure provided by a second embodiment of the present disclosure, and FIG. 8 is a sectional diagram of the assembly structure provided by a third embodiment of the present disclosure. Since the inner joint assembly 2 may have an electric device LP installed in it, an electric socket SL or an electric plug PL needs to be installed in the inner joint assembly 2 or the outer joint assembly 1. The electric socket SL or the electric plug PL can supply power, and further can be used to transmit signals. When the electric device LP is used as a LED (light-emitting diode) lighting device, the electric socket SL or the electric plug PL can adopt T8 lamp specifications. For example, the electric socket SL and the electric plug PL can be a circular electric socket and a circular electric plug, respectively, and the circular electric socket and the circular electric plug can be the specifications of the single-pin electric socket and plug for T8 lamps, but the present disclosure is not limited thereto. Therefore, the circular electric socket and the circular electric plug can also rotate in a stepless manner.

In FIG. 7, the side of the left core part 22 of the assembly structure away from the third case 23 is provided with an electric plug PL, and the side of the right core part 22 of the assembly structure away from the third case 23 is provided with an electric socket SL, wherein the electric plug PL can be inserted into the electric socket SL to electrically connect the electric device in the left inner joint assembly 2 and the electric device in the right inner joint assembly 2 in series. In FIG. 8, the side of the core part 22 far away from third case 23 is provided with an electric socket SL, and the inner wall 114 of the outer joint assembly 1 is provided with an electric plug PL. The inner wall 114 is arranged in the first accommodating space S1, and the inner wall 114 is connected to the first inner surface 112 and be perpendicular to the first inner surface 112. In addition, in the third embodiment of FIG. 8, it can also be modified into that the electric socket SL and the electric plug PL are arranged in the outer joint assembly 1 and the inner joint assembly 2 respectively.

Accordingly, compared with the prior art, the assembly structure of the present disclosure can solve the technical problem that the inner joint assembly and the outer joint assembly of the prior art may be easily loosen when the user rotates the electric device installed in the inner joint assembly by rotating the inner joint assembly. On the other hand, through the assembly structure of the present disclosure, it is possible to achieve stepless and circular rotation of the inner joint assembly, so as to rotate the electric device installed in the inner joint assembly with more convenience. Simply put, only when the card part is inserted into the slot, can the inner joint assembly and outer joint assembly be allowed to be locked with or unlocked from each other by rotation, otherwise only the inner joint assembly can be rotated relative to the outer joint assembly, but cannot be locked or unlocked by rotation.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An assembly structure, comprising:
   an outer joint assembly, comprising a first case, wherein an interior of the first case forms a first accommodating space, the first case has a first outer surface and a first inner surface opposite to the first outer surface, and the first inner surface is provided with a first locking structure in the first accommodating space; and
   an inner joint assembly, comprising a second case and a core part assembly, wherein the core part assembly is composed of a core part and a third case, the second case is used to extend into the first accommodating space, an interior of the second case forms a second accommodating space, the second case has a second outer surface and a second inner surface opposite to the second outer surface, the second outer surface is provided with a second locking structure corresponding to the first locking structure, the core part is used to extend into the second accommodating space, a side of the core part is connected to a side of the third case, an outer surface of the core part contacts the second inner surface, and the second case and the third case are provided with a slot therebetween.

2. The assembly structure of claim 1, wherein when a card part is inserted into the slot, two sides of the card part are respectively engaged by the second case and the third case, and the second locking structure is capable of being locked with or unlocked from the first locking structure by rotation, so that the outer joint assembly and the inner joint assembly is disassembled or assembled; when the card part is not inserted into the slot, the second locking structure cannot be locked with or unlocked from the first locking structure by rotation, but the core part assembly is capable of being rotated relative to the second case with a rotation axis.

3. The assembly structure of claim 2, wherein when the card part is not inserted in the slot, a first maximum static friction force to be overcome for rotating the core part assembly relative to the second case with the rotation axis is smaller than a second maximum static friction force to be overcome for locking or unlocking the second locking structure and the first locking structure by rotation, so that when the core part assembly is rotated relative to the second case with the rotation axis, the second locking structure and the first locking structure cannot be locked or unlocked by rotation.

4. The assembly structure of claim 3, wherein when the card part is inserted into the slot, one of the sides of the card part contacts the second case, and a third maximum static friction force that needs to be overcome when the core part assembly is rotated relative to the second case with the rotation axis is generated, wherein the third maximum static friction force is larger than the second maximum static friction force, so that when the second locking structure and the first locking structure are locked or unlocked by rotation, the core part assembly cannot be rotated relative to the second case with the rotation axis.

5. The assembly structure of claim 1, wherein the first locking structure comprises a plurality of first threads, and the second locking structure comprises a plurality of second threads relative corresponding to the first threads, so that the first locking structure is able to be rotatably engaged with the second locking structure.

6. The assembly structure of claim 1, wherein an electric socket or an electric plug is provided on a side of the core part away from the third case.

7. The assembly structure of claim 1, wherein the first case further has an inner wall, the inner wall is arranged in the first accommodating space, the inner wall is connected to the first inner surface, and the inner wall is provided with an electric socket or an electric plug.

8. The assembly structure of claim 1, wherein the core part and the third case are integrally formed to form the core part assembly.

9. The assembly structure of claim 1, wherein the core part and the third case are connected to each other by at least one fixing means to form the core part assembly.

10. The assembly structure of claim 1, wherein the inner joint assembly further comprises a locating gasket, which is connected to a side of the second case away from the slot and partially protrudes from the second inner surface, and the core part is provided with a locating hole away from the outer surface of the third case, so that when the core part extends into the second accommodating space, the part of the locating gasket protruding from the second inner surface will be accommodated in the locating hole to locate the core part.

\* \* \* \* \*